United States Patent [19]

McKendrick

[11] Patent Number: 4,680,441
[45] Date of Patent: Jul. 14, 1987

[54] PRESSURE REGULATOR CONTROL SYSTEM

[76] Inventor: Lorne McKendrick, 365 W. Girard Ave., Madison Heights, Mich. 48071

[21] Appl. No.: 626,379

[22] Filed: Jun. 29, 1984

[51] Int. Cl.⁴ ............................................. B23K 11/10
[52] U.S. Cl. .................................... 219/91.1; 60/368; 219/89
[58] Field of Search ..................... 219/89, 86.41, 91.1, 219/110, 86.51; 60/368

[56] References Cited

U.S. PATENT DOCUMENTS

| | | | |
|---|---|---|---|
| 3,497,660 | 2/1970 | Henry-Biabaud | 219/89 |
| 4,317,980 | 3/1982 | Goodrich et al. | 219/91.1 |
| 4,447,700 | 5/1984 | Cohen | 219/110 |
| 4,503,312 | 3/1985 | Nakata et al. | 219/110 |

*Primary Examiner*—Clifford C. Shaw
*Attorney, Agent, or Firm*—Gifford, Groh, VanOphem, Sheridan, Sprinkle and Dolgorukov

[57] ABSTRACT

A pressure regulator control system for controlling the pressure with which welding electrodes are engaged against a workpiece comprises a transducer for establishing a first regulated fluid outlet pressure proportional to the strength of an electrical signal delivered to the transducer, and a pressure regulator or booster relay for establishing a second regulated outlet fluid pressure which is a multiple of said first outlet pressure. The outlet of the pressure regulator or booster relay is then applied to the working cylinder controlling displacement of the electrodes. The control system of the preferred embodiment includes interface means for converting digital data received from a computerized control apparatus to an analog signal which is applied to the transducer. A pressurized air supply is connected to the fluid inlets of the transducer and the pressure regulator or booster relay through a filter for eliminating contaminants which can affect the operation of the transducer and pressure regulator or booster relay.

6 Claims, 1 Drawing Figure

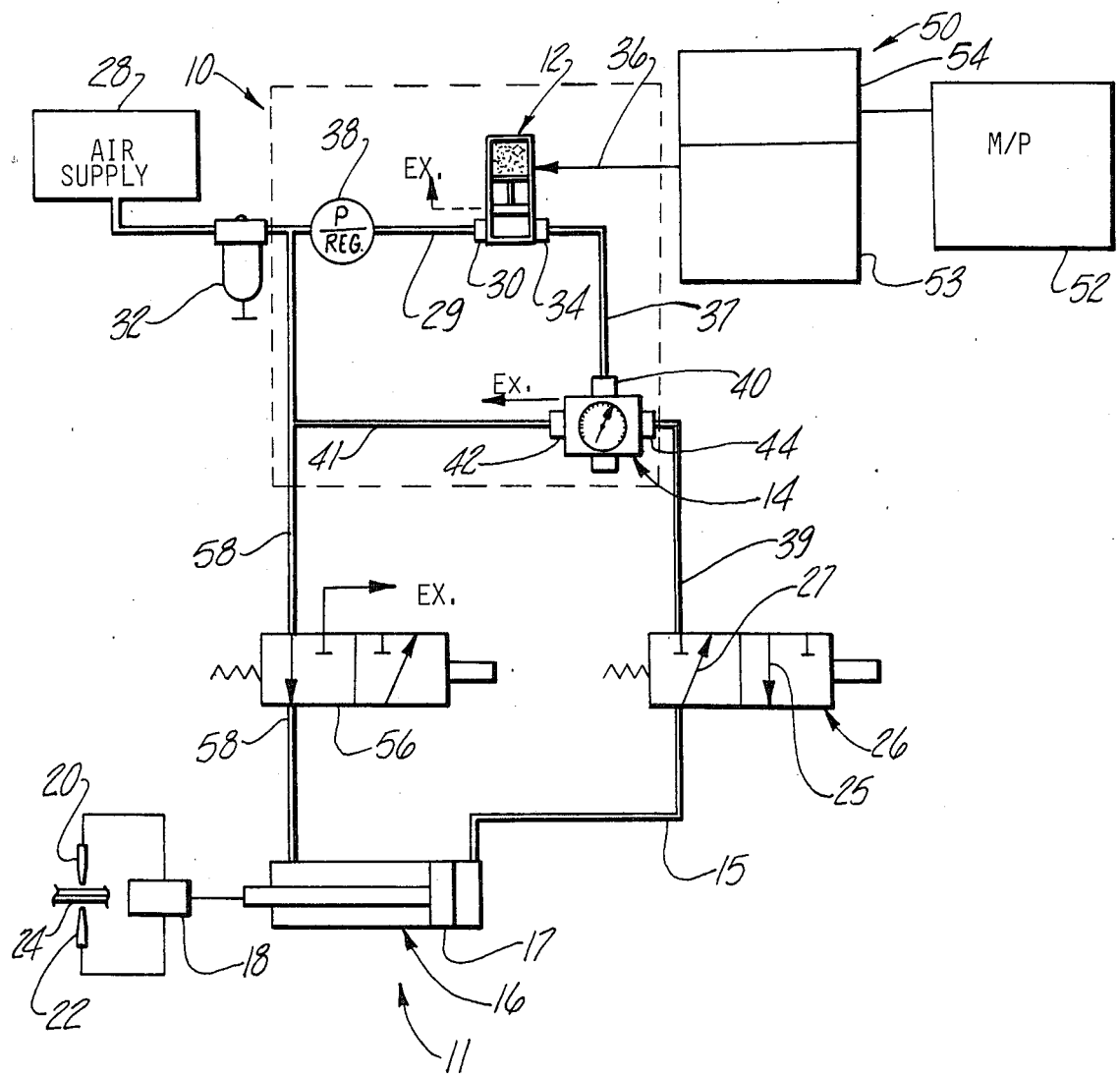

PRESSURE REGULATOR CONTROL SYSTEM

BACKGROUND OF THE PRESENT INVENTION

I. Field of the Present Invention

The present invention relates generally to fluid control devices for applying fluid at a predetermined pressure to a working cylinder, and more particularly to means for precisely regulating the pressure of the fluid being applied to the working cylinder.

II. Description of the Prior Art

Working cylinders, such as pneumatic cylinders, are often used to control displacements of robotic arms and the working tools, such as a welder, secured at the end of a robotic arm. For example, such cylinders have been used to extend and retract relatively displaceable welding electrodes to a predetermined welding position on a workpiece. During the actual welding operation, the electrodes are engaged against the workpiece. In previously known welding systems, the quality of the weld is controlled primarily by variations in the weld time as well as the electrical current being applied to the electrodes during the welding period. As a result, previously known displacement cylinders used for controlling the engagement of the electrodes with the workpiece operated repeatedly at a single pressure to merely engage the electrodes against a workpiece.

Unfortunately, reliance upon variations only in the welding current and welding time can result in ineffective welds, damage to the workpiece, undue delay in forming the weld or extremely high energy requirements to form the welds in particular workpieces. For example, the previously known welders are not well adapted for making effective welds in a laminated workpiece formed from layers of different materials. Thus, it has been extremely difficult if not impossible to weld such workpieces in a quick and efficient manner when only variation of the welding current or welding time are available. On the other hand, it has been found that adjustment of the pressure with which the electrodes engage the workpiece can substantially decrease the welding time or current necessary to form the welds in these laminates.

Nevertheless, previously known pressure regulators for adjusting the amount of pressure applied to a working cylinder for an actuating displacement of the electrodes cannot adjust the pressure as accurately and precisely as desired. In particular, previously known pressure regulators may be manually controlled and thus require time as well as labor to operate. Moreover, manual control of the valves can result in inaccurate adjustment of the valves and the actual pressure delivered at a nominal setting can vary throughout a wide range. In view of the fact that variations in the pressure at which the electrodes are engaged against the workpiece can substantially affect the effectiveness and the efficiency of a welding operation as well as the quality of the welds and the finished workpiece, more accurate and precise control of the pressure applied to the working cylinder can enhance the productivity of the entire assembly process in which the welding operation occurs.

SUMMARY OF THE PRESENT INVENTION

The present invention overcomes the above mentioned disadvantages by providing a pressure regulator control system which provides quick, accurate and precise adjustments of the pressure of the working fluid delivered to the working cylinder. The system generally comprises a pressure transducer for delivering a predetermined outlet pressure in response to an electrical control signal, and an air pilot operator regulator for delivering fluid at a desired fluid pressure to the working cylinder in response to the pressurized fluid from the outlet of the transducer means.

In addition, the air pilot operated regulator preferably comprises a booster means whose outlet pressure is a multiple of the pilot air signal. Preferably, the electrical control signal is one of a plurality of discrete, analog signals provided by an interfacing means for connecting the transducer to a computerized condition signal apparatus. Thus, the present invention provides a pressure regulator control system which automatically controls the delivery of a precise and accurate amount of fluid pressure to a working cylinder such as is used in robotic welding operations. In addition, the system utilizes an air pilot operated regulator means so that supply line pressure contributes to regulation of the pressure applied to the cylinder.

BRIEF DESCRIPTION OF THE DRAWING

The present invention will be more clearly understood by reference to the following detailed description of the preferred embodiment of the present invention when read in conjunction with the accompanying drawing in which like reference characters refer to like parts throughout the view and in which:

FIG. 1 is a diagrammatic view of a pressure regulator control system used in a welding system and constructed in accordance with the present invention.

DETAILED DESCRIPTION OF A PREFERRED EMBODIMENT OF THE PRESENT INVENTION

As shown in the drawing, a pressure regulator control system 10 according to the present invention is connected in a welding electrode displacement system 11. The electrode system 11 includes a pressurized air supply 28 connected to a working cylinder 16 through the pressure regulator control system 10. The working cylinder 16 is in turn connected to a mechanical linkage shown diagrammatically at 18 for displacing the welding electrodes 20 and 22 with respect to a workpiece 24. The electrode displacement system 11 controls the pressure exerted against a workpiece 24 by the electrodes 20 and 22.

The pressure regulator control system 10 includes a pressure transducer 12 whose outlet 34 is connected to an air pilot operated regulator 14. In the preferred embodiment, this regulator 14 is a volume booster type whose outlet pressure is a multiple of the air pilot signal. Of course, it is also within the scope of the present invention to utilize a 1:1 signal output or fractional output regulator so long as it is air pilot operated. The output of the volume booster 14 communicates through a valve 26 to the working cylinder 16.

In the preferred embodiment, the pressurized air supply 28 provides pressurized air to inlet 30 of a transducer 12, the inlet 42 of a volume booster, 14, and the retraction side of the working cylinder 16. Air supply 28, from a source such as an air compressor and associated air circulation conduit system, is connected through a filter 32 in order to remove impurities from the air delivered to the transducer 12, volume booster 14 and the cylinder 16. The filter removes contaminants such as water or lubricant which may have become mixed with the air supply.

The air supply 28 is coupled to the inlet 30 of the transducer 12 through fluid passage means 29. The decontaminated air delivered into the inlet 30 is then acted upon within the transducer 12 so that it exits from the outlet 34 at stable predetermined pressure. The predetermined pressure of the air passing through the outlet 34 is proportional to the strength of the signal delivered to the transducer 12 through a control line 36. The delivery of the control signal will be discussed in greater detail hereinafter. It is sufficient at this point to recognize that the outlet pressure at 34 is proportional to the signal provided by control line 36.

A Fairchild Model 5200 transducer is an example of the type of transducer means which provides such a predetermined outlet pressure which is directly proportional to an electrical signal applied to a floating coil within the transducer housing. In view of the fact that this particular transducer is adapted to regulate a supply pressure of 20 PSIG plus or minus 2 PSIG, delivered to its inlet, a pressure limiting regulator valve 38 can be connected intermediate the air supply 28 and the input 30 of transducer 12 to insure proper operation of the transducer 12. Moreover, with such an arrangement, the Model 5200 can produce a precise predetermined output pressure within the advantageous range of 3-15 PSI.

The outlet 34 of the transducer 12 is connected in fluid communication with the control or signal inlet 40 of the pressure regulator or volume booster 14. The supply inlet 42 of the volume booster 14 is connected to the air supply 28 downstream of the filter 32 by passage means 41. The outlet 44 of volume booster 14 is fluidly connected through passage means 39 to a control valve 26 which controls the delivery of pressurized air to the working cylinder 16 through passage means 15. The air pressure at the outlet 44 is proportional to, and preferably a multiple of, the signal pressure of the fluid entering the inlet 40 of the volume booster 14. The preferred embodiment of the present invention has employed a Bellofram type 75 relay with a signal to output ratio of 1:6 in combination with the Model 5200 transducer to provide fluid to the working cylinder in a desired range of 18 PSI to 90 PSI.

The control signal delivered to control line 36 can be provided in numerous ways. For example, a relay network can be used to supply one of a predetermined number of voltages or currents to the transducer 12. Moreover, in the preferred embodiment of the present invention the control system includes an interface means 50 for connecting the control line 36 from the transducer 12 to a computerized control means 52. The interface means 50 includes a digital to analog converter 53 which accepts binary coded decimal (BCD) data or binary data and converts it to an analog output. As a result, digital information delivered from the computerized control means 52 is converted to discrete values of ac or dc voltage applied to the control line in 36 of the transducer means 12. A Red Lion Controls digital to analog converter has been successfully employed in Applicant's preferred embodiment to provide a plurality of incremental increases and decreases in the signal voltage applied to the Fairchild T5200 transducer means. In addition, depending on the particular computerized control means 52, the interface means 50 can also include attenuation means 54 for adjusting the signal strength of the signal received from the computerized control means 52 to an acceptable input level for the digital to analog converter 53.

The computerized control means 52 can be a programmable computer so that desired changes of the fluid pressure can be automatically accomplished as required during the controlled production of workpieces. In any event, the pressure regulator control system 10 according to the present invention is responsive to changing control signals delivered by an automatic or manual control device to provide quick and accurate adjustments of the fluid pressure being applied to a working cylinder. Although the air supply 28 is maintained at a high nominal pressure, for example, 80-90 PSI in the preferred embodiment, pressure regulator valve 38 reduces the pressure of the air entering the transducer 12 through the inlet 30. The transducer 12 establishes a predetermined fluid pressure at its outlet 34 proportional to the analog signal delivered to the transducer 12 at control line 36. The pressurized fluid is then delivered to control inlet 40 of the air pilot operated regulator or booster means 14 so that the unregulated fluid supplied to the inlet 42 from air supply 28 is stabilized at a second predetermined output pressure proportional to the pressure delivered to the control inlet 40. The stabilized air pressure exiting from the outlet 44 of the volume booster 14 is delivered to the working cylinder 16 in an appropriate manner.

In the electrode displacement system 11 shown in the drawing, the outlet 44 of the volume booster means 14 is connected in fluid communication with the control valve 26. When the valve is open, pressurized fluid is applied to the working side of cylinder 16 through valve passage 25 so that the linkage 18 displaces the electrodes 20 and 22 against the workpiece 24 at a predetermined pressure. The valve 26 is controlled in conjunction with means for controlling the weld time so that the pressure of the electrodes is maintained until after the weld has been completed.

When the valve 26 shifts to the position shown in solid lines in the drawing, the air in the working chamber of the cylinder 16 can be exhausted through the valve passage 27. At the same time, a valve 56 is shifted so that pressurized air from the air supply 28 is supplied through conduit 58 to the retraction side of the cylinder 16. Thus, the piston 17 in cylinder 16 is retracted so that linkage mechanism 18 disengages the electrodes 20 and 22 from the workpiece 24. It will be understood that application of air from the air supply 28 to the retraction side of the cylinder 16 permits quick retraction of the electrodes from the workpiece 24, regardless of the pressure with which the electrodes were engaged against the workpiece. Such full pressure retraction reduces the amount of time necessary to prepare for the next welding operation.

Nevertheless, it will be understood that as the welding requirements of the workpiece 24 or workpieces being operated on is changed, for example when the workpiece 24 includes varied combinations of laminated sections, the pressure with which the electrodes are engaged against the workpiece can be precisely and accurately varied. Moreover, it is to be understood that the interface means 50 can be designed to accommodate a wide variety of control equipment which may be used in controlling the welding operations. Moreover, the use of a transducer means 12 separate from the pressure regulator or booster means 14 permits precise and accurate incremental changes of the first predetermined outlet pressure without the substantial energy input required to act upon the full air supply pressure. In addition, the air pilot pressure regulator or booster means 14 provides precise and accurate adjustments of desired fluid output pressures without requiring substantial electrical energy input to act upon the flow pressure of the air line supply.

Having thus described my invention, many modifications thereto will become apparent to those skilled in the art to which it pertains without departing from the scope and spirit of the present invention as defined in the appended claims.

What is claimed is:

1. A pressure regulator control system for regulating the supply of pneumatic pressure to a welding cylinder from a pressurized air supply in response to at least one electrical control signal, the regulator system comprising:

transducer means for establishing a first predetermined output pressure which is continuously variable in response to said at least one control signal, said transducer means having a transducer air inlet in communication with said air supply, and a transducer air outlet, air pilot operated regulator means for establishing a second predetermined output pressure in response to said first predetermined output pressure, said regulator means having a regulator supply inlet in communiation with said air supply, a regulator air inlet in communication with said transducer air outlet and a regulator air outlet, coupling means for connecting said regulator air outlet to said welding cylinder and means for reducing the pressure of air in communication with said transducer air inlet, wherein said regulator means comprises booster means for estblishing said second predetermined output pressure as a discrete multiple of said first predetermined output pressure.

2. The invention as defined in claim 1 wherein said at least one electrical control signal comprises a plurality of electrical control signals derived from a computerized control means for delivering a plurality of condition signals, wherein said pressure control system further comprises interface means for interfacing said transducer means with said computerized control means for transforming each condition signal to a discrete control signal for said transducer.

3. The invention as defined in claim 2 wherein said condition signal is a digital data signal and wherein said interface means comprises means for converting a digital signal to an analog signal.

4. The invention as defined in claim 1 and comprising means for filtering the air intermediate said air supply and both of said transducer air inlet and said regulator supply inlet.

5. The invention as defined in claim 1 wherein said transducer means comprises a floating coil in a housing, said coil adapted to receive an electrical signal and wherein said transducer produces said first predetermined output pressure directly proportional to said electrical signal.

6. In combination with a pair of welding elecrodes and means for displacing said elecrodes into and out of engagement with a workpiece, said means for displacing comprising a cylinder having a piston slidably displaceable within the cylinder, a supply of pressurized air, and fluid passage means connecting said supply to said cylinder on at least one side of said piston, the improvement comprising;

means for regulating the pressure delivered to said cylinder, said means for regulating comprising;

means for generating an electrical signal corresponding to a desired air pressure, transducer means for establishing a first predetermined output pressure which is continuously variable in response to said electrical signal, means for reducing the pressure of said pressurized air prior to said transducer, air pilot operated pressure regulator means for establishing a second predetermined output pressure which is a discrete multiple of said first predetermined output pressure, and valve means for selectively applying said second predetermined output pressure to said cylinder on one side of said piston.

* * * * *